United States Patent
Chen et al.

(10) Patent No.: US 12,118,989 B2
(45) Date of Patent: Oct. 15, 2024

(54) SPEECH PROCESSING METHOD AND METHOD FOR GENERATING SPEECH PROCESSING MODEL

(71) Applicant: BEIJING BAIDU NETCOM SCIENCE AND TECHNOLOGY CO., LTD., Beijing (CN)

(72) Inventors: Xu Chen, Beijing (CN); Jinfeng Bai, Beijing (CN); Runqiang Han, Beijing (CN); Lei Jia, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 351 days.

(21) Appl. No.: 17/507,437

(22) Filed: Oct. 21, 2021

(65) Prior Publication Data
US 2022/0044678 A1    Feb. 10, 2022

(30) Foreign Application Priority Data
Oct. 27, 2020  (CN) .......................... 202011164617.9

(51) Int. Cl.
*G10L 15/20*  (2006.01)
*G06N 3/084*  (2023.01)
(Continued)

(52) U.S. Cl.
CPC .............. *G10L 15/20* (2013.01); *G06N 3/084* (2013.01); *G10L 15/063* (2013.01); *G10L 15/22* (2013.01);
(Continued)

(58) Field of Classification Search
CPC ....... G10L 15/20; G10L 15/063; G10L 15/22; G10L 21/0232; G10L 21/038; G10L 25/30; G10L 2021/02082; G06N 3/084
See application file for complete search history.

(56) References Cited

U.S. PATENT DOCUMENTS

2018/0260703 A1* 9/2018 Soljacic ................. G06N 3/084
2018/0336911 A1* 11/2018 Dahl ................... G10L 21/0208
(Continued)

FOREIGN PATENT DOCUMENTS

CN    109841206 A    6/2019
CN    110956976 A    4/2020
(Continued)

OTHER PUBLICATIONS

Zhang, Deep Learning for Acoustic Echo Cancellation Noisy and Double-Talk Scenarios, I2018, Interspeech, whole document (Year: 2018).*

(Continued)

*Primary Examiner* — Sonia L Gay
(74) *Attorney, Agent, or Firm* — Lippes Mathias LLP

(57) ABSTRACT

The present disclosure provides a speech processing method, and a method for generating a speech processing model, related to a field of signal processing technologies. The speech processing method includes: obtaining M speech signals to be processed and N reference signals; performing sub-band decomposition on each of the M speech signals and each of the N reference signals to obtain frequency-band components in each speech signal and each reference signal; processing the frequency-band components in each speech signal and each reference signal by using an echo cancellation model, to obtain an ideal ratio mask corresponding to the N reference signals in each frequency band of each speech signal; and performing echo cancellation on each frequency-band component of each speech signal based on the ideal ratio mask corresponding to the N reference signals in each frequency band of each speech signal, to obtain M echo-cancelled speech signals.

17 Claims, 8 Drawing Sheets

(51) Int. Cl.
*G10L 15/06* (2013.01)
*G10L 15/22* (2006.01)
*G10L 21/0208* (2013.01)
*G10L 21/0232* (2013.01)
*G10L 21/038* (2013.01)
*G10L 25/30* (2013.01)

(52) U.S. Cl.
CPC ........ *G10L 21/0232* (2013.01); *G10L 21/038* (2013.01); *G10L 25/30* (2013.01); *G10L 2021/02082* (2013.01)

(56) References Cited

U.S. PATENT DOCUMENTS

| 2019/0043491 | A1* | 2/2019 | Kupryjanow ....... G10L 21/0208 |
| 2019/0251985 | A1 | 8/2019 | Yu et al. |
| 2019/0318755 | A1* | 10/2019 | Tashev ................. G06N 3/045 |
| 2019/0318757 | A1 | 10/2019 | Chen et al. |

FOREIGN PATENT DOCUMENTS

| CN | 111048061 A | 4/2020 |
| CN | 111291759 A | 6/2020 |
| CN | 111292759 A | 6/2020 |
| CN | 111370016 A | 7/2020 |
| CN | 111696580 A | 9/2020 |
| KR | 20150012752 A | 2/2015 |

OTHER PUBLICATIONS

Harsme, Wavelet-based Speech Enhancement: A Statistical Approach, 2004, University of Stellenbosch, pg.ii (Year: 2004).*
Delfarah, Features for Masking-Based Monaural Speech Separation in Reverberant Conditions, 2017, IEEE, whole document (Year: 2017).*
Office Action for Korean Application No. 10-2021-0117561, dated Sep. 14, 2022, 7 pages.
Office Action for Japanese Application No. 2021-175751, dated Sep. 13, 2022, 5 pages.
Office Action for Chinese Application No. 202011164617.9, dated Apr. 21, 2023, 33 pages.

* cited by examiner

SPEECH PROCESSING METHOD AND METHOD FOR GENERATING SPEECH PROCESSING MODEL

CROSS REFERENCE TO RELATED APPLICATION

This application is based on and claims priority to Chinese Patent Application No. 202011164617.9, filed on Oct. 27, 2020, the entire content of which is hereby incorporated by reference.

FIELD

The present disclosure relates to a field of signal processing technologies, particularly to fields of voice technologies, man-machine interaction, and deep learning technologies, and more particularly to a speech processing method, a method for generating a speech processing model, an electronic device.

BACKGROUND

With the development of chip technology and voice technology, more and more intelligent voice interaction devices have entered people's life. For example, for smart speakers and smart TVs in home scenes and smart navigation in car scenes, people have gradually become accustomed to using voice to interact with devices to obtain resources and services. These intelligent voice interaction devices are usually based on deep learning technology and use microphone array and speakers to complete voice interaction with users.

In the process of voice interaction, a speech signal output by a speaker of a device may be received by a microphone of the device through multiple echo paths such as the reflection of the cavity of intelligent hardware and the room. These echo signals may reduce the signal-to-noise ratio of the user's real voice signal, result in problems such as voice recognition errors, false wake-up/wake-up failure, etc.

SUMMARY

According to a first aspect of the present disclosure, a speech processing method is provided. The method includes: obtaining M speech signals to be processed and N reference signals, M and N being positive integers equal to or greater than 1; performing sub-band decomposition on each of the M speech signals and each of the N reference signals to obtain frequency-band components in each speech signal and frequency-band components in each reference signal; processing the frequency-band components in each speech signal and the frequency-band components in each reference signal by using an echo cancellation model, to obtain an ideal ratio mask (IRM) corresponding to the N reference signals in each frequency band of each speech signal; and performing echo cancellation on each frequency-band component of each speech signal based on the ideal ratio mask corresponding to the N reference signals in each frequency band of each speech signal, to obtain M echo-cancelled speech signals.

According to a second aspect of the present disclosure, a method for generating a speech processing model is provided. The method includes: obtaining a training data set, each group of data in the training data set including a reference signal, a speech signal carrying echo, and a labelled ideal ration mask (IRM); performing sub-band decomposition on the reference signal and the speech signal carrying echo in each group to obtain frequency-band components of the reference signal and the speech signal carrying echo in each group; processing the frequency-band components of the reference signal and the speech signal carrying echo in each group by using an initial neural network model, to obtain a predicted IRM corresponding to the reference signal in each group in each frequency-band component of the speech signal carrying echo; and performing back gradient propagation correction on the initial neural network model based on a difference between the predicted IRM of each group and the corresponding labelled IRM, to obtain a trained speech processing model.

According to a third aspect of the present disclosure, a non-transitory computer-readable storage medium having stored therein instructions. The instructions cause a computer to perform the speech processing method according to the first aspect of the present disclosure, or perform the speech processing method according to the second aspect of the present disclosure.

It should be understood that, content described in the Summary is not intended to identify key or important features of embodiments of the disclosure, nor is it intended to limit the scope of the disclosure. Other features of the disclosure will become apparent from the following description.

BRIEF DESCRIPTION OF THE DRAWINGS

The accompanying drawings are used for better understanding the solution and do not constitute a limitation of the disclosure.

DETAILED DESCRIPTION

The exemplary embodiments of the present disclosure are described below with reference to the accompanying drawings, which include various details of the embodiments of the present disclosure to facilitate understanding, and should be regarded as merely exemplary. Therefore, those skilled in the art should appreciate that various changes and modifications can be made to the embodiments described herein without departing from the scope and spirit of the present disclosure. Likewise, for clarity and conciseness, descriptions of well-known functions and structures are omitted in the following description.

It is notable that, during voice interaction, the sound output by a speaker of an intelligent voice interaction device may be received by a microphone of the device through multiple echo paths such as the reflection of a cavity of smart hardware of the device and the room. These echo signals may reduce a signal-to-noise ratio of a real voice signal of a user, causing problems such as speech recognition errors, false wakeups/wakeup failures, etc., and even further causing device malfunctions and other situations that seriously affect user experience. Therefore, a method may be used to eliminate these echo signals, so as to improve the signal-to-noise ratio of the real voice (also referred as speech), and improve speech recognition rate, wake-up accuracy, and user interaction experience.

In the related art, a signal output by the speaker is usually estimated to obtain an echo signal (an analog signal), and then the estimated echo signal is subtracted from an input signal of the microphone to obtain an estimated real voice signal, so as to achieve the purpose of echo cancellation. This echo cancellation technology relies on the estimated echo signal, which leads to low echo cancellation accuracy and poor effect.

Therefore, the embodiments of the present disclosure propose a speech processing method and device, and a method and device for generating a speech processing model. In the embodiment of the present disclosure, the echo cancellation is performed on each frequency-band component in a speech signal based on an ideal ratio mas IRM corresponding to the real reference signal in each frequency band of the speech signal, without relying on any analog signal, thereby the accuracy and generalization of echo cancellation are improved, and the user experience is improved.

The speech processing method and device, and a method and device for generating a speech processing model according to embodiments of the present disclosure will be described below with reference to accompany drawings.

Figure 1:
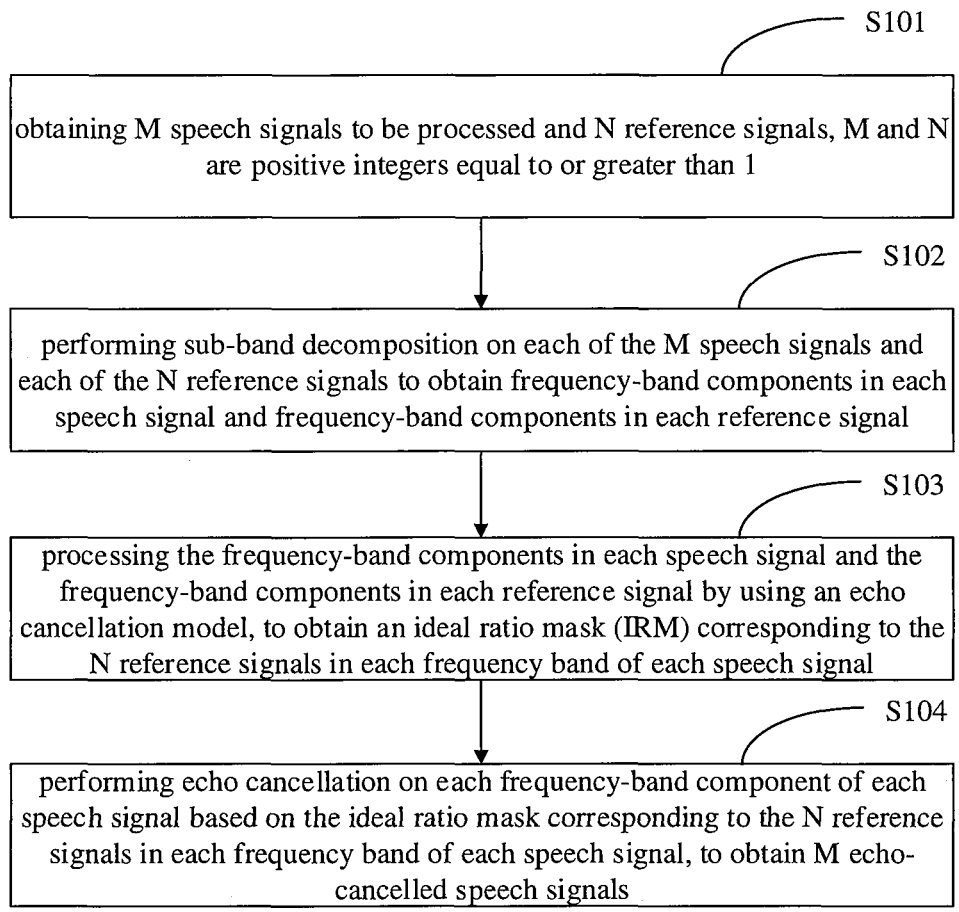
FIG. 1 is a flow chart of a speech processing method according to an embodiment of the present disclosure.

FIG. 1 is a flow chart of a speech processing method according to an embodiment of the present disclosure.

It is notable that, the speech processing method in the embodiments of the present disclosure is applied to a speech processing device, which may be a smart home appliance, such as a smart speaker, a smart TV, etc., or may be a smart vehicle-mounted device.

At S101, M speech signals to be processed and N reference signals are obtained, M and N are positive integers equal to or greater than 1.

A reference signal refers to a speech signal actually played by the speech processing device itself, for example, by a speaker. A speech signal to be processed is a mixed speech signal composed of a standard speech signal and an echo signal. The standard speech signal is a pure speech signal that is to be recognized or processed by the speech processing device, and the echo signal refers to a signal collected by the microphone after the a speech signal played by the speech processing device itself passes through multiple echo paths such as the reflection of a cavity of the intelligent hardware or the room.

The speech signal and the reference signal in the embodiments of the disclosure are real signals that are actually collected. For example, the reference signal is "sound played by a loudspeaker", and the echo signal is "sound collected by a microphone after the sound is played by the loudspeaker", and the speech signal to be processed is "human voice+the sound collected by a microphone after the sound is played by the loudspeaker".

Generally, when the speech processing device is playing an audio, the user may have interaction requirements, and thus the user may send a voice signal, i.e., a standard speech signal to the speech processing device. In this case, the microphone of the speech processing device may collect a mixed speech signal composed of the standard speech signal and an echo signal. At this time, if the speech processing device has M microphone arrays, M speech signals to be processed may be obtained. In addition, if there are N speakers in the speech processing device, N reference signals may be acquired through an acquisition circuit. It is understandable that, at this time, each speech signal to be processed includes an echo signal corresponding to the N reference signals.

At S102, sub-band decomposition is performed on each of the M speech signals and each of the N reference signals to obtain frequency-band components in each speech signal and frequency-band components in each reference signal.

In some embodiments, after the M speech signals to be processed and the N reference signals are obtained, each speech signal to be processed is split into multiple sub-band audio signals, and each reference signal is split into multiple sub-band audio signals. Each frequency-band component in each speech signal and each reference signal is obtained. Thereby, the speech signals and the reference signals are converted into frequency band characteristics. Compared with the traditional fast Fourier transformation (FFT), the sub-band decomposition may better prevent frequency band leakage and may make the information between different frequency bands more independent, thus, it is helpful to improve the efficiency of echo cancellation.

At S103, the frequency-band components in each speech signal and the frequency-band components in each reference signal are processed by using an echo cancellation model, to obtain an ideal ratio mask (IRM) corresponding to the N reference signals in each frequency band of each speech signal.

The echo cancellation model is a model associating an ideal ratio mask (IRM) with each frequency-band component of the mixed speech signals and the reference signals. That is, each frequency-band components of each mixed speech signal and frequency-band components of the reference signals are inputs, and an IRM is an output. The IRM represents a proportion of the standard speech signal in each frequency-band component of the mixed speech signals.

In some embodiments, after the respective frequency-band components in each speech signal and the respective frequency-band components in each reference signal are obtained, the frequency-band components are inputted into the echo cancellation model, so that the echo cancellation model processes the frequency-band components in each speech signal and the respective frequency-band components in each reference signal, and outputs the IRM corresponding to the N reference signals in each frequency band of each speech signal.

At S104, echo cancellation is performed on each frequency-band component of each speech signal based on the IRM corresponding to the N reference signals in each frequency band of each speech signal, to obtain M echo-cancelled speech signals.

In some embodiments, after the IRM corresponding to the N reference signals in each frequency band of each speech signal, the echo cancellation is performed on each frequency-band component of each speech signal based on the IRM, and M speech signals with echo cancelled (the M echo-cancelled speech signal) are obtained. The speech signal with echo cancelled is the standard speech signal, that is, the pure "human voice" to be recognized or processed.

It is notable that, the IRM in the embodiments of the present disclosure is the proportion of the standard speech signal in each frequency band of the mixed speech signal. Therefore, when the echo cancellation is performed on each frequency-band component, each obtained IRM is multiplied by a corresponding frequency-band component in a corresponding mixed speech signal. That is, the echo in the corresponding component is eliminated. Thus, the echo-cancelled frequency-band components in each speech signal are obtained, and the echo-cancelled components in each speech signal are synthesized to obtain M speech signals with echo cancelled, i.e., the M echo-cancelled speech signals.

For example, if there is one speech signal to be processed and one reference signal, after the speech signal and the reference signal are obtained, sub-band decomposition is performed on the speech signal and the reference signal respectively to obtain the frequency-band components in the speech signal and the reference signal. Each frequency-band component is input into the echo cancellation model, so that, after the echo cancellation is performed the echo cancellation model outputs an IRM1 corresponding to the reference signal in the first frequency band of the speech signal, an IRM2 corresponding to the reference signal in the second frequency band of the speech signal, an IRM3 corresponding to the reference signal in the third frequency band of the speech signal, and an IRM4 corresponding to the reference signal in the fourth frequency band of the speech signal. After that, the IRM1 is multiplied by the first frequency-band component to eliminate the echo signal in the first frequency band, and the IRM2 is multiplied by the second frequency-band component to eliminate the echo signal in the second frequency band, the IRM3 is multiplied by the third frequency-band component to eliminate the echo signal in the third frequency band, and the IRM4 is multiplied by the fourth frequency-band component to eliminate the echo signal in the fourth frequency band. Finally, the four frequency-band components obtained after the echo cancellation may be synthesized to obtain an echo-cancelled speech signal.

With the speech processing method according to embodiments of the present disclosure, the echo cancellation is performed on each frequency-band component of the speech signal based on the IRM corresponding to the real reference signals in each frequency band of the speech signal, without relying on any analog signal. Thereby, the accuracy and generalization of echo cancellation are improved, and the user experience is improved.

It is notable that, in actual applications, the relationship between the reference signal and the echo signal may be different due to different application scenarios. For example, a relationship between a reference signal and an echo signal in the home appliance is different from a relationship between a reference signal and an echo signal in a vehicle-mounted device. Therefore, in the above step S102, the sub-band decomposition may be performed on the speech signal and the reference signal according to the environment in which the speech processing device is located. For example, when the speech processing device is located in a high-traffic environment such as a station, the echo signal in the speech signal may be mainly concentrated in the high frequency bands. Thus, the speech signal and the reference signal may be decomposed into multiple sub-band audio signals, i.e., performing a fine sub-band decomposition. In some embodiments, a fine sub-band decomposition may be performed on the high frequency bands of the speech signal and the reference signal, and a rough sub-band decomposition may be performed on low frequency bands of the speech signal and the reference signal. In some embodiments, the sub-band decomposition may also be performed on the speech signal and reference signal according to a type of speech processing device.

Figure 2:
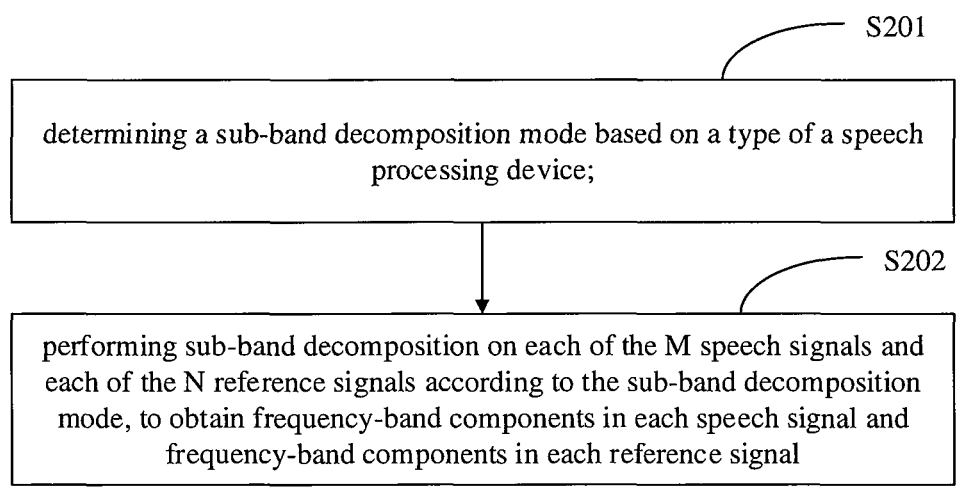
FIG. 2 is a flow chart of performing sub-band decomposition according to an embodiment of the present disclosure.

That is, in an embodiment of the present disclosure, as illustrated in FIG. 2, the action at S102 may include the following.

At S201, a sub-band decomposition mode is determined based on a type of a speech processing device.

The sub-band decomposition mode may include a fine sub-band decomposition mode, a rough sub-band decomposition mode, and the like.

At S202, sub-band decomposition is performed on each of the M speech signals and each of the N reference signals according to the sub-band decomposition mode, to obtain the frequency-band components in each speech signal and the frequency-band components in each reference signal.

For example, when the speech processing device is a home appliance, the echo signal is mainly concentrated in the low frequency bands. Thus, when the sub-band decomposition is performed on each speech signal and each reference signal, a rough decomposition may be performed. When the speech processing device is a vehicle-mounted device, the echo signal is mainly concentrated in an odd-numbered frequency band. Thus, when the sub-band decomposition is performed on each speech signal and each reference signal, the fine sub-band decomposition may be performed.

Thus, the sub-band decomposition is performed on each speech signal and each reference signal according to the type of speech processing device, not only frequency band leakage is prevented, making the signals between frequency bands are more independent, thereby improving the accuracy of echo cancellation, but also the unnecessary sub-band decomposition for the echo cancellation is prevented, making the sub-band decomposition simpler and more effective.

It is understandable that, the echo cancellation model in the embodiments of the present disclosure generates the IRMs by taking frequency-band components of each speech signal and frequency-band components of each reference signal as input signals, so as to facilitate subsequent echo cancellation. There may be a singular signal in the frequency-band components inputted into echo cancellation model. The singular signal may lead to longer processing time of the model, and may make the calculation of the model unable to converge. Therefore, in order to avoid this phenomenon and for the convenience of subsequent data processing, the input signals of the echo cancellation model may be normalized.

Figure 3:
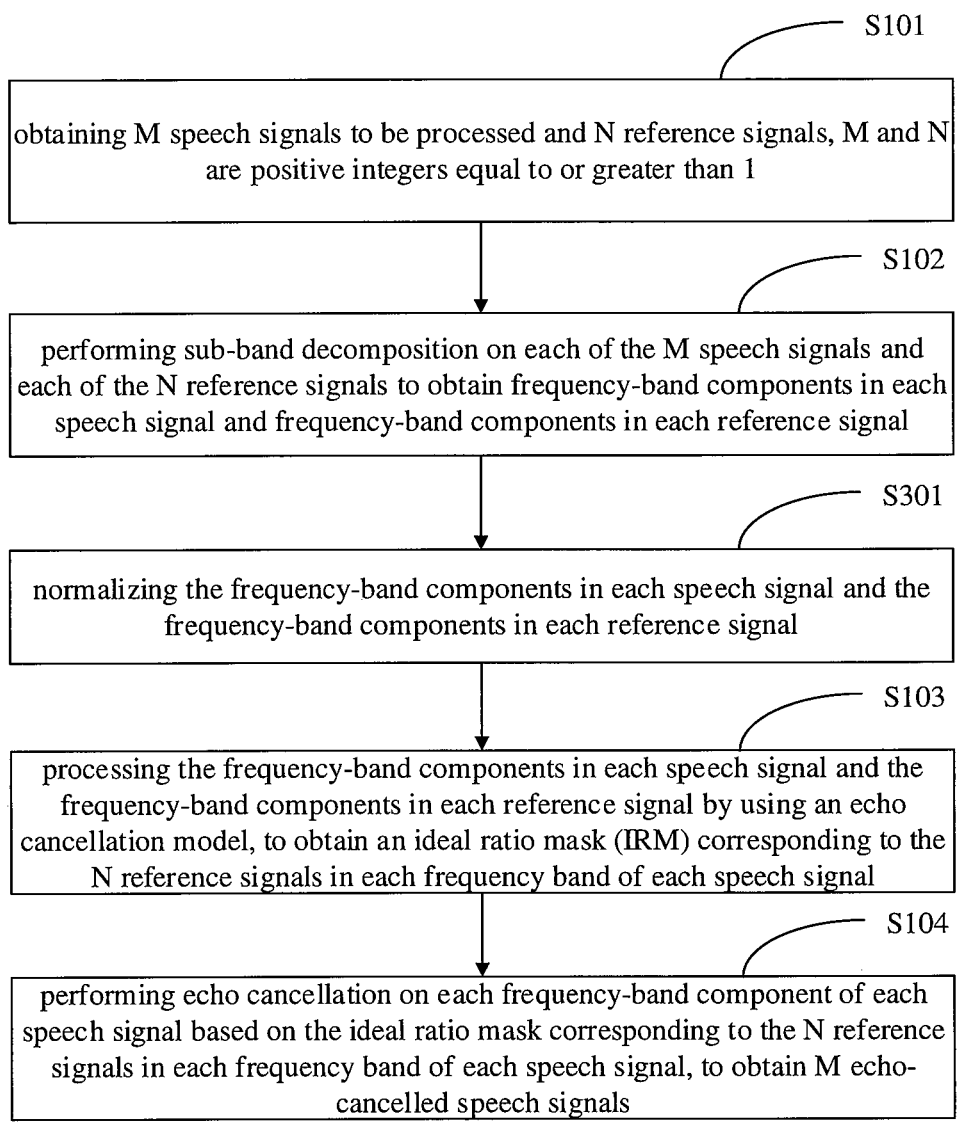
FIG. 3 is a flow chart of a speech processing method according to an embodiment of the present disclosure.

In an embodiment of the present disclosure, as illustrated in FIG. 3, before using the echo cancellation model to process the frequency-band components in each speech signal and each reference signal, i.e., before the above step S103, the method may further include the following.

At S301, the frequency-band components in each speech signal and the frequency-band components in each reference signal are normalized.

In some embodiments, after the frequency-band components in each speech signal and the frequency-band components in each reference signal are obtained, the frequency-band components in each speech signal and the frequency-band components in each reference signal are normalized. And then the normalized frequency-band components are input into the echo cancellation model, so that the echo cancellation model outputs the IRM corresponding to the N reference signals in each frequency band of each speech signal after processing. So that the echo cancellation can be performed based on the obtained IRMs.

It is notable that, in the embodiment of the disclosure, the processes related to the number of reference signals include the sub-band decomposition and the normalization processing, therefore, the computational complexity in the embodiments of the disclosure may not increase linearly with the increase of the number of reference signals.

Therefore, after each frequency-band component is normalized, the normalized frequency-band components are input to the echo cancellation model, thereby avoiding excessive processing time and inconvergence phenomenon caused by singular frequency-band components, and facilitating the processing of the model.

Figure 4:
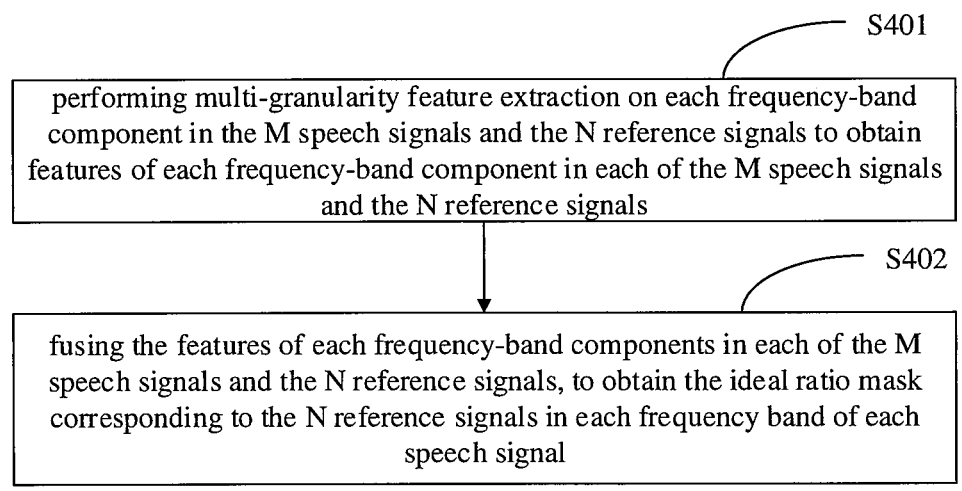
FIG. 4 is a flow chart of obtaining an ideal ration mask (IRM) in a speech processing method according to an embodiment of the present disclosure.

In an embodiment of the present disclosure, as illustrated in FIG. 4, the above step S103 may include the following.

At S401, multi-granularity feature extraction is performed on each frequency-band component in the M speech signals and the N reference signals to obtain features of each frequency-band component in each of the M speech signals and the N reference signals.

In some embodiments, the echo cancellation model may be a neural network model based on causal convolution and long short term memory (LSTM) network.

In some embodiments, after each frequency-band component of each speech signal and each reference signal is input into the echo cancellation model, the echo cancellation model performs causal convolution processing on each frequency-band component to achieve feature extraction of each frequency-band component. When the convolution processing is performed, feature extraction of different dimensions may be implemented by setting different numbers of channels.

In this way, after convolution processing is performed on each frequency-band component, the feature extraction of each frequency-band component may be realized. Moreover, the current echo signal only depends on the reference signal, therefore, there is no hard delay in the whole echo cancellation process, improving the response speed of speech processing.

At S402, the features of each frequency-band component in the M speech signals and the N reference signals are fused, to obtain the IRM corresponding to the N reference signals in each frequency band of each speech signal.

In some embodiments, after the features of each frequency-band component in each speech signal and each reference signal are obtained, the echo cancellation model sends the features into the stacked LSTM network to model the dynamic characteristics of the speech over time. An output of LSTM network constitutes the learned high-level features, and then the high-level features are sent to a mask layer to obtain the IRM corresponding to the N reference signals in each frequency band of each speech signal. And then, each IRM is multiplied by a corresponding frequency-band component of a corresponding speech signal to eliminate the echo signal in the frequency-band component.

In order to more clearly describe the speech processing method according to the embodiment of the present disclosure, an example is used to illustrate the method in the following.

Figure 5:
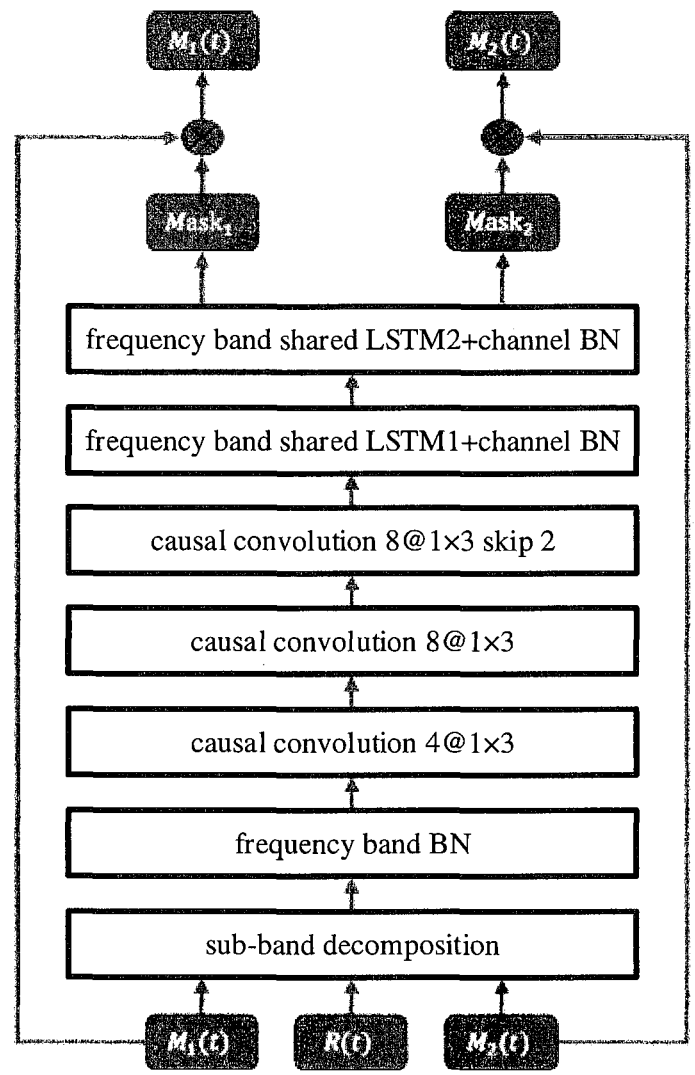
FIG. 5 is a schematic diagram illustrating an echo cancellation process according to an embodiment of the present disclosure.

As illustrated in FIG. 5, two speech signals and one reference signal are obtained. $M_1(t)$ is the first speech signal, $M_2(t)$ is the second speech signal, and $R(t)$ is the reference signal. Multiple frequency-band components are obtained by performing sub-band decomposition on $M_1(t)$, $M_2(t)$, and $R(t)$ respectively. After that, the frequency-band components are normalized, and the normalized frequency-band components are input to the echo cancellation model. The echo cancellation model performs causal convolution processing on each frequency-band component to realize the feature extraction of each frequency-band component. During the convolution processing, feature extraction of different dimensions may be implemented by setting different numbers of channels. For example, 4@1*3 in FIG. 5 represents: the number of channels is set to 3, the convolution kernel is set to 1*3, and the number of output channels is set to 4. The convolution kernel means that the convolution processing is performed on the current audio frame and two audio frames adjacent to and previous to the current audio frame.

After the convolution process, the normalization process is conducted across batch dimension, time dimension and band dimension. Moreover, the weights of LSTM are shared across all bandwidths, so do the convolution layers. Thus, $Mask_1$ corresponding to the reference signal $R(t)$ in the first speech signal $M_1(t)$ is obtained, and $Mask_2$ corresponding to the reference signal $R(t)$ in the second speech signal $M_2(t)$ is obtained. $Mask_1$ is multiplied by WO to eliminate the echo signal in $M_1(t)$, and $Mask_2$ is multiplied by $M_2(t)$ to eliminate the echo signal in $M_2(t)$, thus two echo-cancelled speech signals are obtained.

Therefore, the echo cancellation model is used to extract multi-granularity features for each frequency-band component to extract the frequency-band features, and then fusion processing is performed on each frequency-band feature, and the IRM corresponding to the reference signals in each frequency band of each speech signal is obtained. Thus, when performing echo cancellation, the weight parameters of the model remain unchanged. Regardless of whether the echo signal is music, voice or ITS (text to speech), the echo is eliminated based on the IRM output by the echo cancellation model, ensuring the stability of echo cancellation.

Figure 6:
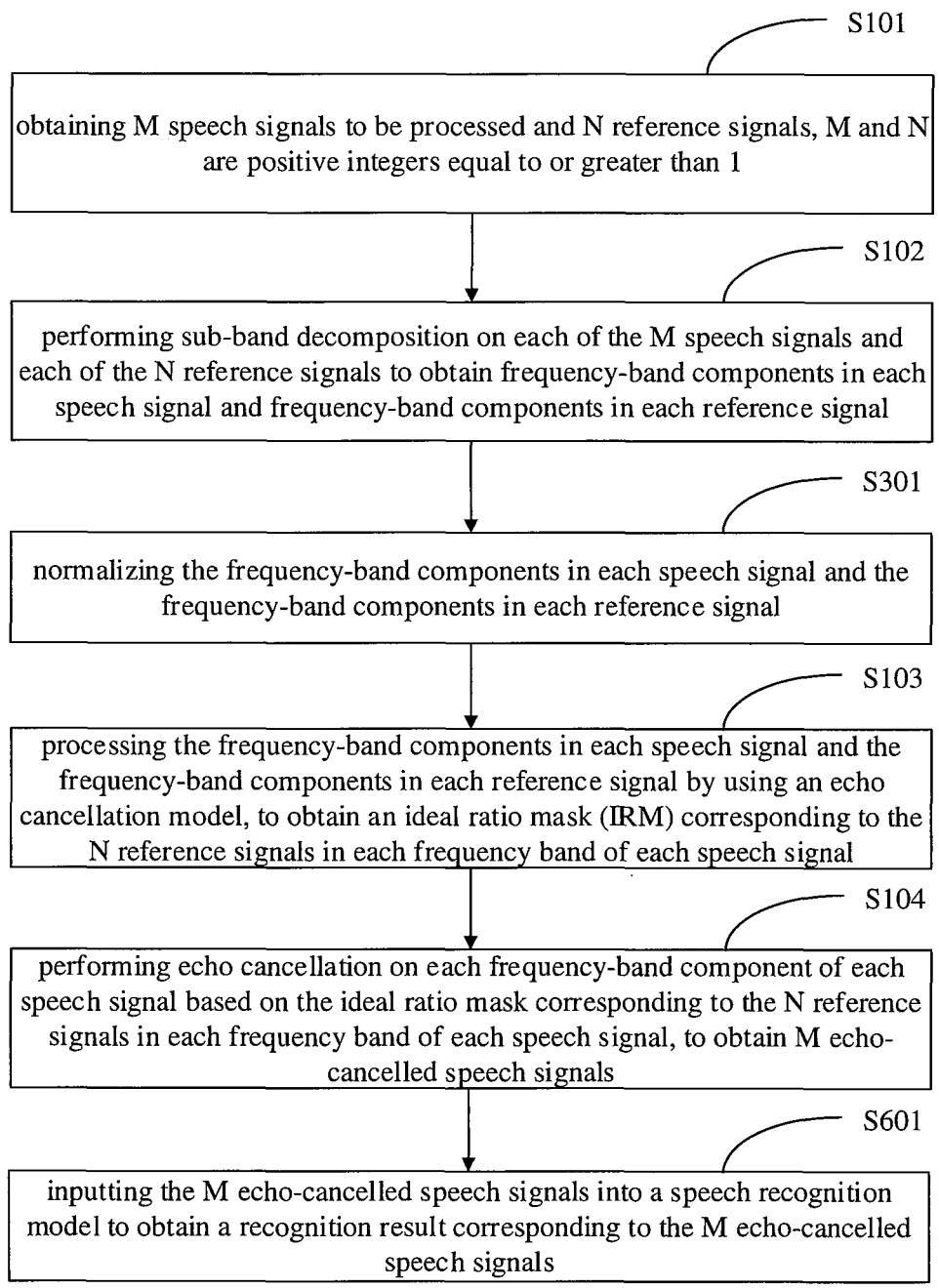
FIG. 6 is a flow chart of a speech processing method according to an embodiment of the present disclosure.

It should be noted that, the neural-network-based echo cancellation model in the embodiments of the disclosure may be directly connected to the front-end of a speech recognition model and a speech wake-up model, to perform an end-to-end joint training, which is conducive to the adjustment of the model weight by the gradient of the back propagation, further improving the accuracy of speech recognition and wake-up under internal noise. That is, in an embodiment of the present disclosure, as illustrated in FIG. 6, after obtaining the M echo-cancelled speech signals, i.e., after the above step S104, the method may include the following.

At S601, the M echo-cancelled speech signals are input into a speech recognition model to obtain a recognition result corresponding to the M echo-cancelled speech signals.

In some embodiments, the speech recognition model may be a neural network model with speech signals as input and recognition results as output. It is notable that, multiple speech signals without echo signals may be used as sampling signals to perform learning and training to obtain a speech recognition model.

In some embodiments, after the echo-cancelled speech signal, i.e., the standard speech signal is obtained, the standard speech signal is input into the speech recognition model, and then the speech recognition model outputs a speech recognition result corresponding to the standard speech signal through self-learning.

For example, an echo-cancelled speech signal is "What is the temperature today", then, a recognition result output by the speech recognition model is "Broadcast the temperature today". Thus, the speech processing device controls its speaker to broadcast an audio signal of "The temperature today is 24 degrees Celsius".

The speech processing method according to the embodiment of the present disclosure may also be used in a wake-up function when the device is in an internal noise scene. That is, after the echo-cancelled speech signal (the standard speech signal) is obtained, the echo-cancelled speech signal may be input into a speech wake-up model, to realize an internal noise wake-up function.

In some embodiments, when the speech processing device is in a voice broadcast scene, if the device receives a wake-up speech signal (carrying an echo signal) of a user, the device first obtains a reference signal actually broadcast currently. And then the device performs sub-band decomposition on the wake-up speech signal and the reference signal to obtain frequency-band components, and normalizes each frequency-band component. After that, an IRM corresponding to the reference signal in each frequency band of the wake-up speech signal is obtained by using an echo cancellation model to process the frequency-band components. And then, each IRM is multiplied by a corresponding frequency-band component to obtain multiple echo-cancelled frequency-band components. An echo-cancelled wake-up speech signal may be obtained after the multiple echo-cancelled frequency-band components are synthesized, and the speech processing device may respond accordingly according to the echo-cancelled wake-up speech.

Therefore, the echo cancellation model based on the neural network may be directly connected to the front end of the speech recognition model and the speech wake-up model for end-to-end joint training, so as to improve the accuracy of speech recognition and speech wake-up under internal noise, and provide space for improving the model performance in scenes such as wake-up under internal noise and speech detection under internal noise.

Figure 7:
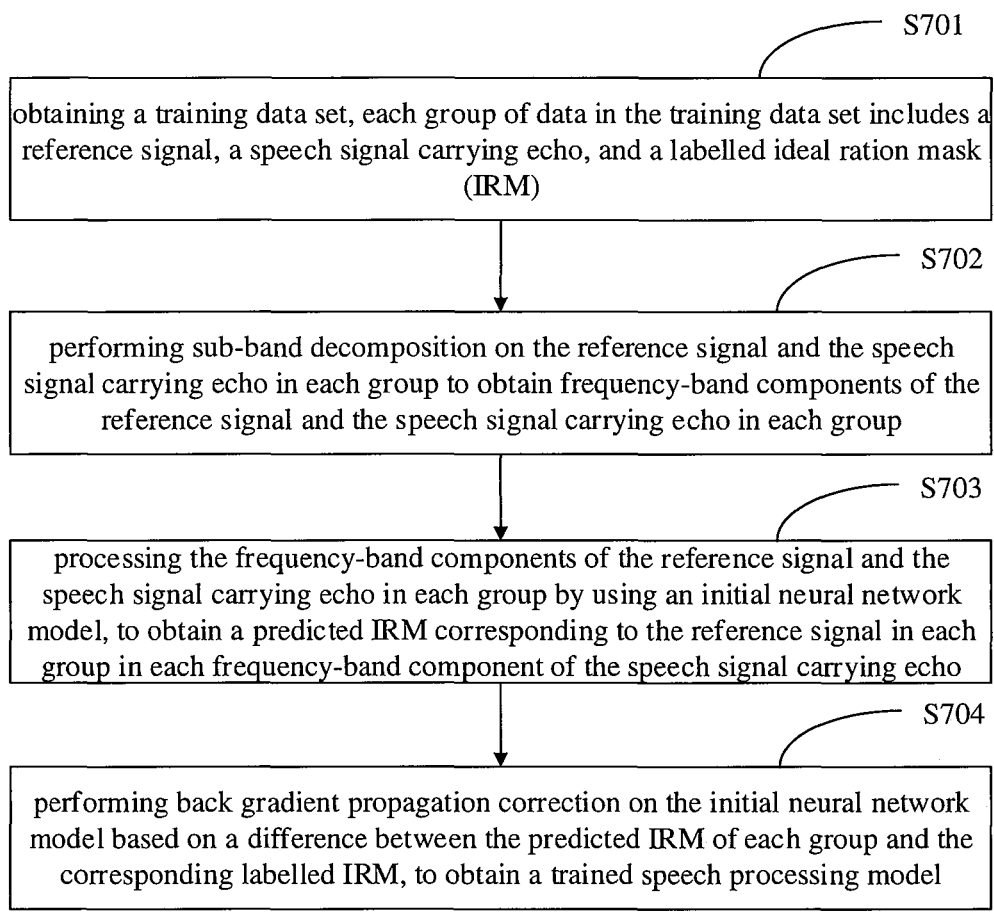
FIG. 7 is a flow chart of a method for generating a speech processing model according to an embodiment of the present disclosure.

Embodiments of the present disclosure further provide a method for generating a speech processing model. FIG. 7 is a flow chart of a method for generating a speech processing model according to an embodiment of the present disclosure.

As illustrated in FIG. 7, the method for generating a speech processing model may include the following.

At S701, a training data set is obtained, each group of data in the training data set includes a reference signal, a speech signal carrying echo, and a labelled ideal ration mask (IRM).

The labeled IRM may be obtained based on an actual standard speech signal and a speech signal carrying, or it may be obtained based on a standard speech signal, a reference signal, and a corresponding echo signal. The standard speech signal is a pure voice signal to be recognized or processed by a speech processing device.

At S702, sub-band decomposition is performed on the reference signal and the speech signal carrying echo in each group to obtain frequency-band components of the reference signal and frequency-band components of the speech signal carrying echo in each group.

This step is similar with the step S102, which is not elaborated here.

At S703, the frequency-band components of the reference signal and the frequency-band components of the speech signal carrying echo in each group are processed by using an initial neural network model, to obtain a predicted IRM corresponding to the reference signal in each group in each frequency-band component of the speech signal carrying echo.

It is understandable that, the IRM represents a proportion of the standard speech signal in the speech signal carrying echo. Therefore, when the reference signal and the speech signal carrying echo are known, a corresponding IRM alone may be predicted.

In some embodiments, after the frequency-band components in the reference signal and in the speech signal carrying echo in each group are obtained, the frequency-band components, for each group, may be input to the initial neural network model, so that the initial neural network model outputs a predicted IRM.

At S704, back propagation gradient correction is performed on the initial neural network model based on a difference between the predicted IRM of each group and the corresponding labelled IRM, to obtain a trained speech processing model.

It is notable that, the initial neural network model is a neural network model with a reference signal and a speech signal carrying echo as input and with a predicted IRM as output. The initial neural network model may output the predicted IRM only. In order to ensure a real IRM corresponding to the reference signal and the speech signal carrying echo is output, in embodiments of the disclosure, the initial neural network model is modified based on a standard speech signal to train a speech processing model that takes a reference signal and a speech signal carrying echo as the input and takes the IRM as the output.

In some embodiments, after the above steps S701 to S703 are performed, the labeled IRM and the predicted IRM corresponding to each group containing a reference signal and a speech signal may be obtained, and a mean square error (MSE) between the labeled IRM and the predicted IRM may be calculated, so that a loss value is determined through the mean square error, and a gradient vector is determined through the backward gradient propagation. And then each weight is adjusted through the gradient vector, to make the mean square error tend to 0 or converge, so that the trained speech processing model is generated on the basis of the initial network model. The smaller the mean square error, the higher the accuracy of the generated speech processing model is.

It is notable that, the speech processing model in the embodiments of the present disclosure is a neural network model taking the speech signal to be processed and the reference signal as the input and taking a real IRM as the output. Therefore, echo cancellation may be performed by the speech processing model. That is, during a process of performing speech processing, the speech signal to be processed and the reference signal are input into the speech processing model, and then the speech processing model outputs the true IRM corresponding to the input. And then, the IRM output by the speech processing model is multiplied by the speech signal to be processed to obtain the echo-cancelled speech signal, i.e., the standard speech signal.

Based on the above description, with the present disclosure, the speech processing model is obtained by training the initial neural network model, so that the echo in a speech signal may be cancelled through the speech processing model, and then the echo-cancelled speech signal is input into the speech recognition model or the speech wake-up model, so that the speech recognition model outputs a corresponding recognition result. In addition, after the initial neural network model and the speech recognition model or the speech wake-up model are connected in series, the speech processing and recognition model training can be performed uniformly, so that the corresponding recognition result may be output through the model.

With the method for generating a speech processing model according to the embodiments of the present disclosure, the speech processing model is generated based on the real reference signals, the speech signals carrying echo, and labelled IRMs, without relying on any analog signals, thereby improving the accuracy and generalization of the speech processing model, and improving the user experience.

Figure 8:
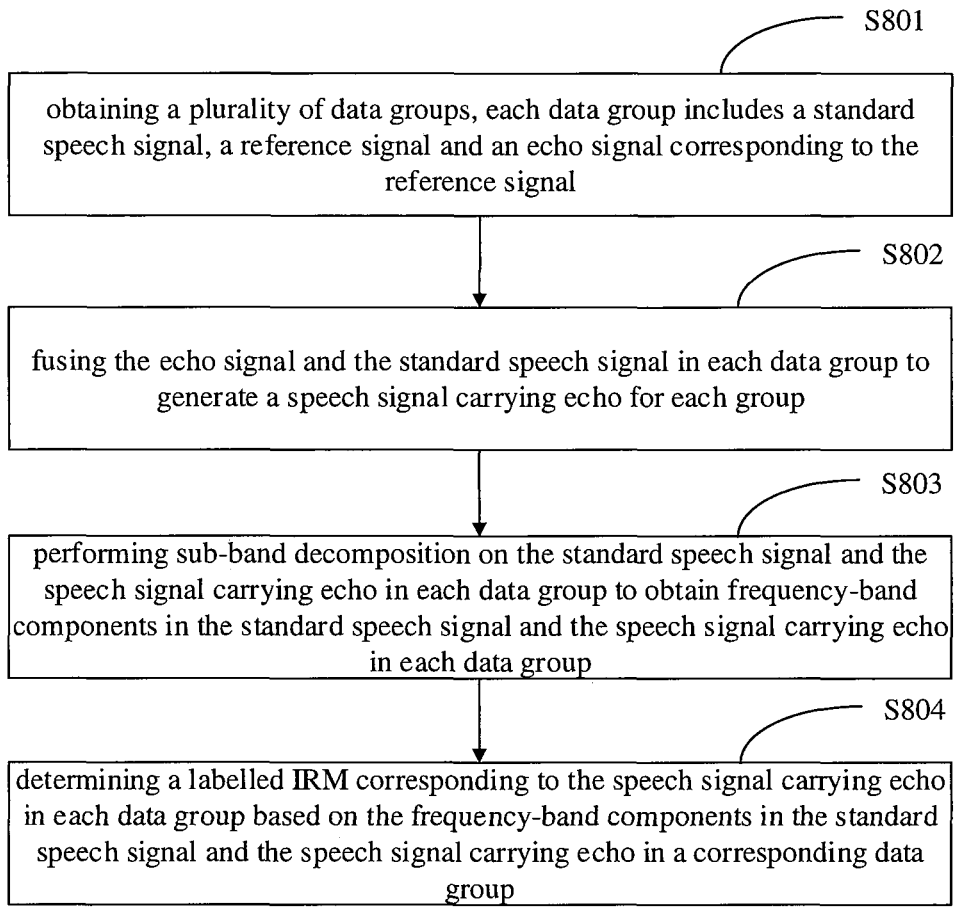
FIG. 8 is a flow chart of obtaining a training data set in a method for generating a speech processing model according to an embodiment of the present disclosure.

Each group of training data in the training data set in the embodiments of the present disclosure includes a reference signal, a speech signal carrying echo, and a labeled IRM, and the labeled IRM is obtained based on an actual standard speech signal and the speech signal carrying echo, or based on a standard speech signal, a reference signal and a corresponding echo signal. Therefore, the training data set may be obtained through the following embodiments:

In an embodiment of the present disclosure, as illustrated in FIG. 8, the foregoing step S701 may include the following.

At S801, a plurality of data groups are obtained, each data group includes a standard speech signal, a reference signal and an echo signal corresponding to the reference signal.

In some embodiments, a speech processing device that is playing audio may be placed in a quiet environment, so that each microphone of the device may receive an echo signal of a reference signal played by the device. In this way, multiple groups of reference signals and corresponding echo signals may be obtained. After that, multiple standard speech signals may be obtained.

At S802, the echo signal and the standard speech signal in each data group are fused to generate a speech signal carrying echo for each group.

In some embodiments, after the multiple groups of standard speech signals, reference signals, and corresponding echo signals are obtained, in order to make the generated speech signals carrying echo have strong generalization capabilities, the standard speech signal and the corresponding echo signal in each group may be fused based on the environment in which speech processing device locates and the type of speech processing device, or the standard speech signal and the corresponding echo signal in each group may be fused according to a certain signal-to-noise ratio.

That is, in an embodiment of the present disclosure, the echo signal in each group is fused with a corresponding standard speech signal according to different signal-to-noise ratios to generate multiple groups of speech signals carrying echo.

The signal-to-noise ratio represents a ratio of the standard speech signal to the echo signal in the speech signal carrying echo. That is, a proportion of an echo signal in a speech signal carrying echo varies with the signal-to-noise ratio.

In order to improve the generalization ability of the speech processing model, different signal-to-noise ratios may be set in advance, so that the echo signals and the standard speech signals in the multiple groups may be fused respectively according to different signal-to-noise ratios to generate multiple groups of speech signals containing echo, and the multiple groups of speech signals has different signal-to-noise ratios. Thus, the generalization of the speech signal containing echo is improved, and the generalization performance of the speech processing model is improved.

At S803, sub-band decomposition is performed on the standard speech signal and the speech signal carrying echo in each data group to obtain frequency-band components in the standard speech signal and the speech signal carrying echo in each data group.

At S804, a labelled IRM corresponding to the speech signal carrying echo in each data group is determined based on the frequency-band components in the standard speech signal and the speech signal carrying echo in a corresponding data group.

Figure 9:
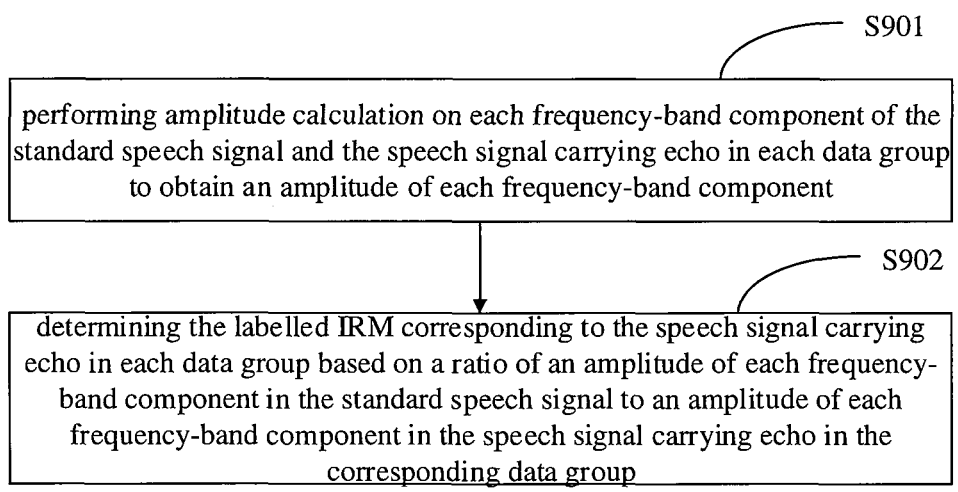
FIG. 9 is a flow chart of determining a labelled IRM according to an embodiment of the present disclosure.

Further, as illustrated in FIG. 9, the step at S804 may include the following.

At S901, amplitude calculation is performed on each frequency-band component of the standard speech signal and the speech signal carrying echo in each data group to obtain an amplitude of each frequency-band component.

At S902, the labelled IRM corresponding to the speech signal carrying echo in each data group is determined based on a ratio of an amplitude of each frequency-band component in the standard speech signal to an amplitude of each frequency-band component in the speech signal carrying echo in the corresponding data group.

In some embodiments, after each frequency-band component of the standard speech signal and the speech signal carrying echo in each data group is obtained, the amplitude calculation may be performed on each frequency-band component to obtain the amplitude of each frequency-band component. And then, the ratio of the amplitude of each frequency-band component in the standard speech signal to the amplitude of each frequency-band component in the speech signal carrying echo is obtained, so that multiple ratios are obtained. The multiple ratios among the amplitudes of the frequency-band components of the standard speech signal and the amplitudes of the frequency-band components of a corresponding speech signal carrying echo are fused, to obtain the labelled IRM of each standard speech signal in a corresponding speech signal carrying echo. Thus, multiple groups of real labeled IRMs used for training are obtained.

That is, for a frequency-band component with echo, a labelled IRM*an amplitude of the frequency-band component with echo=an amplitude of a standard frequency-band component.

Therefore, the labelled IRM of the speech signal carrying echo is determined based on the amplitudes of the real standard speech signal and the speech signal carrying echo, to implement the generation of the speech processing model, which is conducive to making the neural network more focused on echo cancellation of amplitude spectrum.

It is understandable that, the initial neural network model in the embodiments of the present disclosure is a model that takes frequency-band components of each group of reference signals and speech signals carrying echo as input signals, and takes a predicted IRM as the output, and the output predicted IRM is used for generation of the speech processing model. There may be singular signals in the frequency-band components input to the initial neural network model. The singular signals may cause lead to longer processing time of the model, and may make the calculation of the model unable to converge. Therefore, in order to avoid this phenomenon and for the convenience of subsequent data processing, the input signal of the initial neural network model may be normalized.

Figure 10:
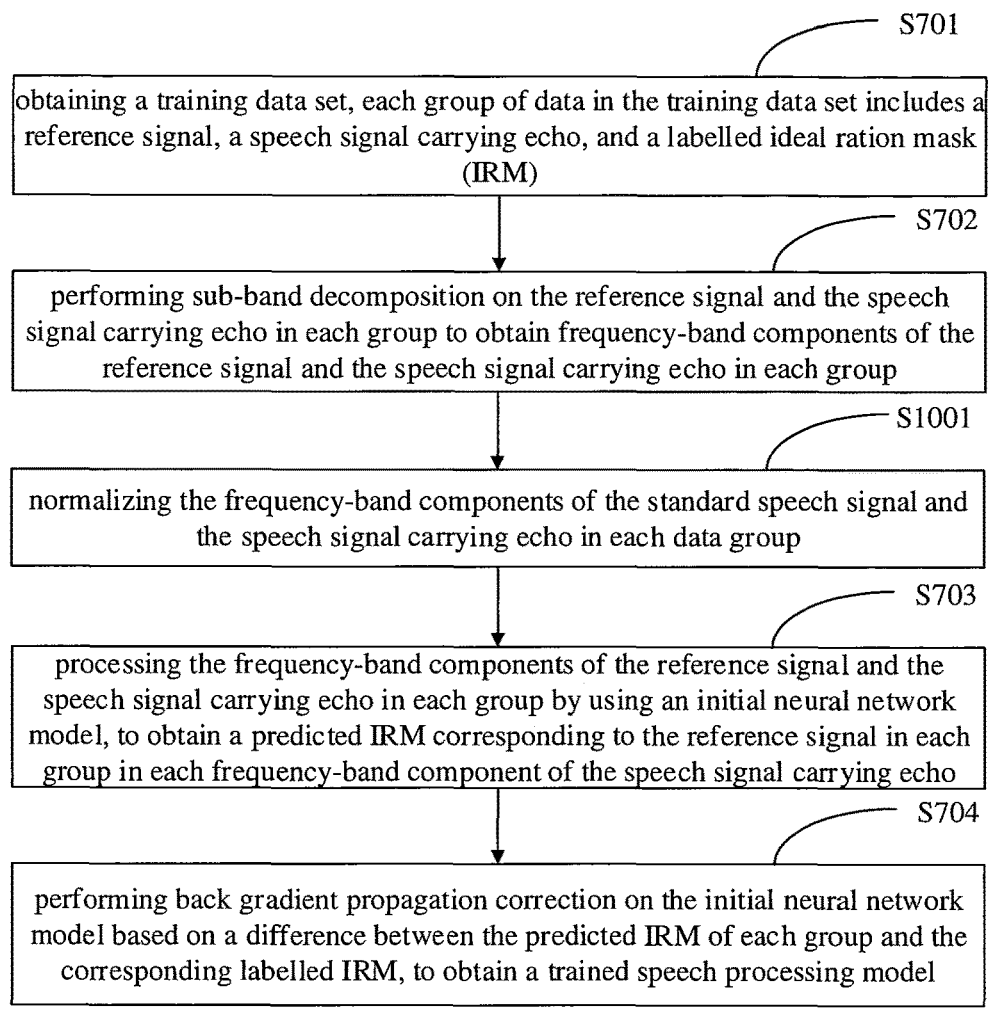
FIG. 10 is a flow chart of a method for generating a speech processing model according to an embodiment of the present disclosure.

In an embodiment of the present disclosure, as illustrated in FIG. 10, before processing the frequency-band components of the reference signal and the frequency-band components of the speech signal carrying echo in each group by using an initial neural network model, that is, before the above step S703, the method may also include the following.

At S1001, the frequency-band components of the standard speech signal and the speech signal carrying echo in each data group are normalized.

In some embodiments, after frequency-band components in the speech signal and the reference signal of each group are obtained, the frequency-band components are normalized, and then the normalized frequency-band components are input into the initial neural network model for processing, so that the initial neural network model outputs the labeled IRM corresponding to the speech signal carrying echo of each group after the processing, and the labeled IRM is used for the generation of the speech processing model.

Therefore, after each frequency-band component is normalized, the normalized frequency-band components are input into the initial neural network model, thereby avoiding excessive processing time and inconvergence caused by singular frequency-band components, and facilitating the processing of the model.

Figure 11:
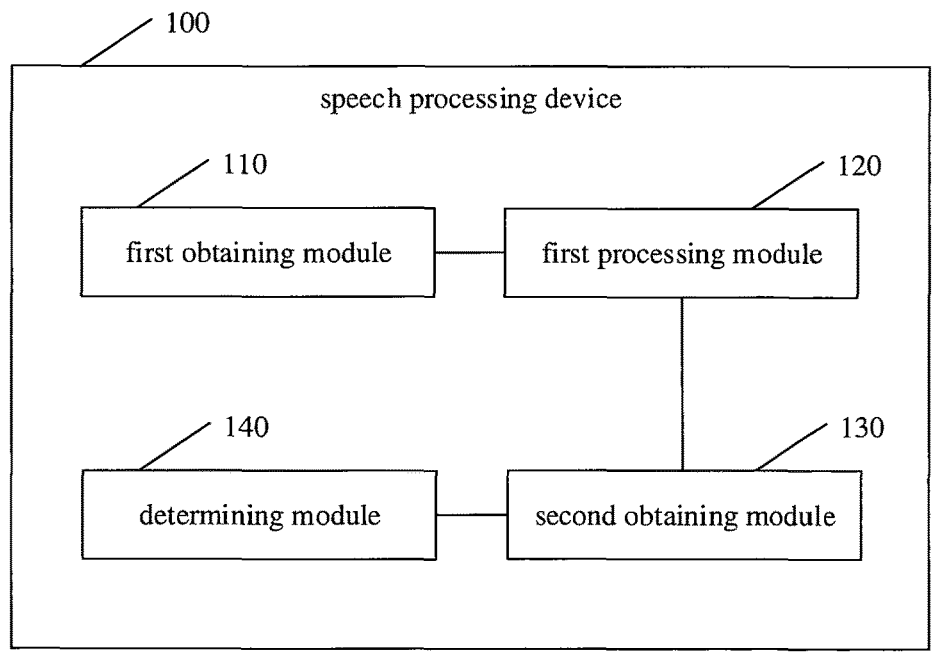
FIG. 11 is a block diagram illustrating a speech processing device according to an embodiment of the present disclosure.

Embodiments of the present disclosure further provide a speech processing device. FIG. 11 is a block diagram illustrating a speech processing device according to an embodiment of the present disclosure.

As illustrated in FIG. 11, the speech processing device 100 includes a first obtaining module 110, a first processing module 120, a second processing module 130, and a third processing module 140.

The first obtaining module 110 is configured to obtain M speech signals to be processed and N reference signals, M and N being positive integers equal to or greater than 1. The first processing module 120 is configured to perform sub-band decomposition on each of the M speech signals and each of the N reference signals to obtain frequency-band components in each speech signal and frequency-band components in each reference signal. The second processing module 130 is configured to process the frequency-band components in each speech signal and the frequency-band components in each reference signal by using an echo cancellation model, to obtain an ideal ratio mask (IRM) corresponding to the N reference signals in each frequency band of each speech signal. The third processing module 140 is configured to perform echo cancellation on each frequency-band component of each speech signal based on the ideal ratio mask corresponding to the N reference signals in each frequency band of each speech signal, to obtain M echo-cancelled speech signals.

In an embodiment of the present disclosure, the first processing module 120 is configured to: determine a sub-band decomposition mode based on a type of a speech processing device; and perform sub-band decomposition on each of the M speech signals and each of the N reference signals according to the sub-band decomposition mode.

In an embodiment of the present disclosure, the speech processing device 100 further includes: a fourth processing module, configured to normalize the frequency-band components in each speech signal and the frequency-band components in each reference signal before processing the frequency-band components in each speech signal and the frequency-band components in each reference signal by using the echo cancellation model.

In an embodiment of the present disclosure, the second processing module 130 may include a feature extraction unit and a feature fusion unit.

The feature extraction unit is configured to perform multi-granularity feature extraction on each frequency-band component in the M speech signals and the N reference signals to obtain features of each frequency-band component in each of the M speech signals and the N reference signals. The feature fusion unit is configured to fuse the features of each frequency-band components in each of the M speech signals and the N reference signals, to obtain the ideal ratio mask corresponding to the N reference signals in each frequency band of each speech signal.

In an embodiment of the present disclosure, the speech processing device 100 further includes: an inputting module, configured to input the M echo-cancelled speech signals into a speech recognition model after obtaining the M echo-cancelled speech signals, to obtain a recognition result corresponding to the M echo-cancelled speech signals.

It is notable that, for other specific implementation manners of the speech processing device according to the embodiments of the present disclosure, reference may be made to the specific implementation manners of the foregoing speech processing method, details are not described herein again.

With the speech processing device according to embodiments of the present disclosure, the echo cancellation is performed on each frequency-band component of the speech signal based on the IRM corresponding to the real reference signals in each frequency band of the speech signal, without relying on any analog signal. Thereby, the accuracy and generalization of echo cancellation are improved, and the user experience is improved.

Figure 12:
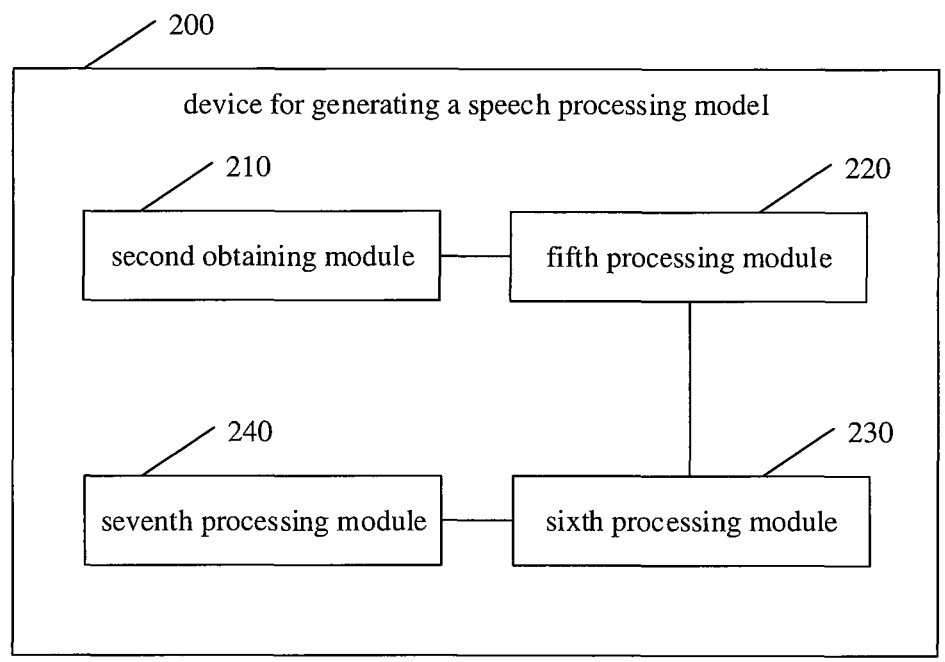
FIG. 12 is a block diagram illustrating a device for generating a speech processing model according to an embodiment of the present disclosure.

To implement the above embodiments, embodiments of the present disclosure further provide a device for generating a speech processing model. FIG. 12 is a block diagram illustrating a device for generating a speech processing model according to an embodiment of the present disclosure.

As illustrated in FIG. 12, the device 200 for generating a speech processing model includes a second obtaining module 210, a fifth processing module 220, a sixth processing module 230, and a seventh processing module 240.

The second obtaining module 210 is configured to obtain a training data set. Each group of data in the training data set comprises a reference signal, a speech signal carrying echo, and a labelled ideal ration mask (IRM). The fifth processing module 220 is configured to perform sub-band decomposition on the reference signal and the speech signal carrying echo in each group to obtain frequency-band components of the reference signal and the speech signal carrying echo in each group. The sixth processing module 230 is configured to process the frequency-band components of the reference signal and the speech signal carrying echo in each group by using an initial neural network model, to obtain a predicted IRM corresponding to the reference signal in each group in each frequency-band component of the speech signal carrying echo. The seventh processing module 240 is configured to perform back gradient propagation correction on the initial neural network model based on a difference between the predicted IRM of each group and the corresponding labelled IRM, to obtain a trained speech processing model.

In an embodiment of the present disclosure, the second obtaining module 210 is configured to: obtain a plurality of data groups, each data group including a standard speech signal, a reference signal and an echo signal corresponding to the reference signal: fuse the echo signal and the standard speech signal in each data group to generate a speech signal carrying echo for each group; perform sub-band decomposition on the standard speech signal and the speech signal carrying echo in each data group to obtain frequency-band components in the standard speech signal and the speech signal carrying echo in each data group; and determine a labelled IRM corresponding to the speech signal carrying echo in each data group based on the frequency-band components in the standard speech signal and the speech signal carrying echo in a corresponding data group.

In an embodiment of the present disclosure, the second obtaining module 210 is configured to: fuse the echo signal and the standard speech signal in each data group based on different signal-to-noise rations to generate a plurality of groups of speech signals carrying echo.

In an embodiment of the present disclosure, the second obtaining module 210 is configured to: perform amplitude calculation on each frequency-band component of the standard speech signal and the speech signal carrying echo in each data group to obtain an amplitude of each frequency-band component; and determine the labelled IRM corresponding to the speech signal carrying echo in each data group based on a ratio of an amplitude of each frequency-band component in the standard speech signal to an amplitude of each frequency-band component in the speech signal carrying echo in the corresponding data group.

In an embodiment of the present disclosure, the device for generating a speech processing model further includes: an eighth processing module, configured to normalize the frequency-band components of the standard speech signal and the speech signal carrying echo in each data group before processing the frequency-band components of the reference signal and the speech signal carrying echo in each group by using the initial neural network model.

It is notable that, for other specific implementation manners of the device for generating a speech processing model according to the embodiments of the present disclosure, reference may be made to the specific implementation manners of the foregoing method for generating a speech processing model, details are not described herein again.

With the device for generating a speech processing model according to the embodiments of the present disclosure, the speech processing model is generated based on the real reference signals, the speech signals carrying echo, and labelled IRMs, without relying on any analog signals, thereby improving the accuracy and generalization of the speech processing model, and improving the user experience.

According to embodiments of the present disclosure, the present disclosure further provides an electronic device for implementing the speech processing method or the method for generating a speech processing model, and a readable storage medium. Description will be made below with reference to FIG. 13.

Figure 13:
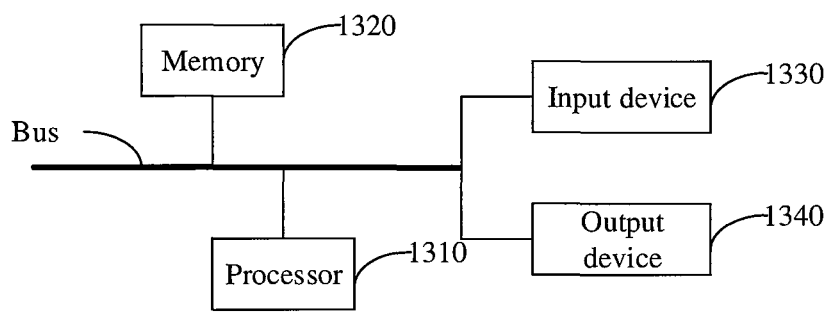
FIG. 13 is a block diagram of an electronic device for implementing a speech processing method according to an embodiment of the present disclosure.

FIG. 13 is a block diagram of an electronic device for implementing a speech processing method or a method for generating a speech processing model according to an embodiment of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as intelligent voice interactive devices, personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 13, the electronic device includes: one or more processors 1310, a memory 1320, and interfaces for connecting various components, including a high-speed interface and a low-speed interface. The various components are interconnected using different buses and can be mounted on a common mainboard or otherwise installed as required. The processor 1310 may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 1310 is taken as an example in FIG. 13.

The memory 1320 is a non-transitory computer-readable storage medium according to the disclosure. The memory stores instructions executable by at least one processor, so that the at least one processor executes the speech processing method or the method for generating a speech processing model according to the disclosure. The non-transitory computer-readable storage medium of the disclosure stores computer instructions, which are used to cause a computer to execute the speech processing method or the method for generating a speech processing model according to the disclosure.

As a non-transitory computer-readable storage medium, the memory 1320 is configured to store non-transitory software programs, non-transitory computer executable programs and modules, such as program instructions/modules (for example, the first obtaining module 110, the first processing module 120, the second processing module 130, and the third processing module 140 shown in FIG. 11, or the second obtaining module 210, the fifth processing module 220, the sixth processing module 230, and the seventh processing module 240 shown in FIG. 12) corresponding to the speech processing method or the method for generating a speech processing model in the embodiments of the disclosure. The processor 1310 executes various functional applications and data processing of the electronic device by running non-transitory software programs, instructions, and modules stored in the memory 1320, that is, implementing the speech processing method or the method for generating a speech processing model in the foregoing method embodiments.

The memory 1320 may include a program storage area and a data storage area, where the program storage area may store an operating system and application programs required for at least one function. The data storage area may store data created according to the use of the electronic device for implementing the method. In addition, the memory 1320 may include a high-speed random access memory, and a non-transitory memory, such as at least one magnetic disk storage device, a flash memory device, or other non-transitory solid-state storage device. In some embodiments, the memory 1320 may optionally include a memory remotely disposed with respect to the processor 1310, and these remote memories may be connected to the electronic device for implementing the above methods through a network. Examples of the above network include, but are not limited to, the Internet, an intranet, a local area network, a mobile communication network, and combinations thereof.

The electronic device used to implement the method may further include: an input device 1330 and an output device 1340. The processor 1310, the memory 1320, the input device 1330, and the output device 1340 may be connected through a bus or in other manners. In FIG. 13, the connection through the bus is taken as an example.

The input device 1330 may receive inputted numeric or character information, and generate key signal inputs related to user settings and function control of an electronic device for implementing the above methods, such as a touch screen, a keypad, a mouse, a trackpad, a touchpad, an indication rod, one or more mouse buttons, trackballs, joysticks and other input devices. The output device 1304 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (egg, a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other. The server may be a cloud server, also known as a cloud computing server or a cloud host, which is a host product in the cloud computing service system, to solve defects such as difficult management and weak business scalability in the traditional physical host and Virtual Private Server (VPS) service.

With the technical solution according to embodiments of the present disclosure, the echo cancellation is performed on each frequency-band component of the speech signal based on the IRM corresponding to the real reference signals in each frequency band of the speech signal, without relying on any analog signal. Thereby, the accuracy and generalization of echo cancellation are improved, and the user experience is improved. In addition, the model used for echo cancellation is generated based on the real reference signals, speech signals carrying echo and the labeled IRMs, without relying on any analog signal, thereby the accuracy and generalization of the speech processing model are improved, and the user experience is improved.

In the description of the present disclosure, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, such as two, three, etc., unless specified otherwise.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A speech processing method, comprising:
obtaining M speech signals to be processed and N reference signals, wherein M and N are positive integers equal to or greater than 1;
performing sub-band decomposition on each of the M speech signals and each of the N reference signals to obtain frequency-band components in each speech signal and frequency-band components in each reference signal;
processing the frequency-band components in each speech signal and the frequency-band components in each reference signal by using an echo cancellation model, to obtain an ideal ratio mask (IRM) corresponding to the N reference signals in each frequency band of each speech signal; and performing echo cancellation on each frequency-band component of each speech signal based on the ideal ratio mask corresponding to the N reference signals in each frequency band of each speech signal, to obtain M echo-cancelled speech signals;

wherein processing the frequency-band components in each speech signal and the frequency-band components in each reference signal by using the echo cancellation model to obtain the IRM corresponding to the N reference signals in each frequency band of each speech signal comprises:

performing multi-granularity feature extraction on each frequency-band component in the M speech signals and the N reference signals to obtain features of each frequency-band component in each of the M speech signals and the N reference signals; and fusing the features of each frequency-band components in each of the M speech signals and the N reference signals, to obtain the IRM corresponding to the N reference signals in each frequency band of each speech signal.

2. The speech processing method according to claim 1, wherein performing sub-band decomposition on each of the M speech signals and each of the N reference signals comprises:
determining a sub-band decomposition mode based on a type of a speech processing device; and
performing sub-band decomposition on each of the M speech signals and each of the N reference signals according to the sub-band decomposition mode.

3. The speech processing method according to claim 1, wherein performing sub-band decomposition on each of the M speech signals and each of the N reference signals comprises:
determining a sub-band decomposition mode based on environment in which a speech processing device is located; and
performing sub-band decomposition on each of the M speech signals and each of the N reference signals according to the sub-band decomposition mode.

4. The speech processing method according to claim 1, before processing the frequency-band components in each speech signal and the frequency-band components in each reference signal by using the echo cancellation model, further comprising:
normalizing the frequency-band components in each speech signal and the frequency-band components in each reference signal.

5. The speech processing method according to claim 1, after obtaining the M echo-cancelled speech signals, further comprising:
inputting the M echo-cancelled speech signals into a speech recognition model to obtain a recognition result corresponding to the M echo-cancelled speech signals.

6. A method for generating a speech processing model, comprising:
obtaining a training data set, wherein each group of data in the training data set comprises a reference signal, a speech signal carrying echo, and a labelled ideal ration mask (IRM);
performing sub-band decomposition on the reference signal and the speech signal carrying echo in each group to obtain frequency-band components of the reference signal and the speech signal carrying echo in each group;

processing the frequency-band components of the reference signal and the speech signal carrying echo in each group by using an initial neural network model, to obtain a predicted IRM corresponding to the reference signal in each group in each frequency-band component of the speech signal carrying echo; and performing back gradient propagation correction on the initial neural network model based on a difference between the predicted IRM of each group and the corresponding labelled IRM, to obtain a trained speech processing model;

wherein processing the frequency-band components of the reference signal and the speech signal carrying echo in each group by using an initial neural network model, to obtain a predicted IRM corresponding to the reference signal in each group in each frequency-band component of the speech signal carrying echo comprises:

performing multi-granularity feature extraction on each frequency-band component of the reference signal and the speech signal carrying echo in each group, to obtain features of each frequency-band component in each of the reference signal and the speech signal; and fusing the features of each frequency-band component in each of the reference signal and the speech signal, to obtain the predicted IRM corresponding to the reference signal in each group in each frequency-band component of the speech signal carrying echo.

7. The method according to claim 6, wherein obtaining the training data set comprises:
obtaining a plurality of data groups, wherein each data group comprises a standard speech signal, a reference signal and an echo signal corresponding to the reference signal;
fusing the echo signal and the standard speech signal in each data group to generate a speech signal carrying echo for each group;
performing sub-band decomposition on the standard speech signal and the speech signal carrying echo in each data group to obtain frequency-band components in the standard speech signal and the speech signal carrying echo in each data group; and
determining a labelled IRM corresponding to the speech signal carrying echo in each data group based on the frequency-band components in the standard speech signal and the speech signal carrying echo in a corresponding data group.

8. The method according to claim 7, wherein fusing the echo signal and the standard speech signal in each data group to obtain the speech signal carrying echo for each data group comprises: fusing the echo signal and the standard speech signal in each data group based on different signal-to-noise rations to generate a plurality of groups of speech signals carrying echo.

9. The method according to claim 7, wherein determining the labelled IRM corresponding to the speech signal carrying echo in each data group based on the frequency-band components in the standard speech signal and the speech signal carrying echo in the corresponding data group comprises:
performing amplitude calculation on each frequency-band component of the standard speech signal and the speech signal carrying echo in each data group to obtain an amplitude of each frequency-band component;

determining the labelled IRM corresponding to the speech signal carrying echo in each data group based on a ratio of an amplitude of each frequency-band component in the standard speech signal to an amplitude of each frequency-band component in the speech signal carrying echo in the corresponding data group.

10. The method according to claim 6, before processing the frequency-band components of the reference signal and the speech signal carrying echo in each group by using the initial neural network model, further comprising:
normalizing the frequency-band components of the standard speech signal and the speech signal carrying echo in each data group.

11. An electronic device, comprising:
at least one processor; and
a memory communicatively coupled with the at least one processor;
wherein, the memory stores instructions executable by the at least one processor that, when executed by the at least one processor, cause the at least one processor to perform a speech processing method, the method comprising:
obtaining M speech signals to be processed and N reference signals, wherein M and N are positive integers equal to or greater than 1;
performing sub-band decomposition on each of the M speech signals and each of the N reference signals to obtain frequency-band components in each speech signal and frequency-band components in each reference signal;
processing the frequency-band components in each speech signal and the frequency-band components in each reference signal by using an echo cancellation model, to obtain an ideal ratio mask (IRM) corresponding to the N reference signals in each frequency band of each speech signal; and
performing echo cancellation on each frequency-band component of each speech signal based on the ideal ratio mask corresponding to the N reference signals in each frequency band of each speech signal, to obtain M echo-cancelled speech signals;
wherein processing the frequency-band components in each speech signal and the frequency-band components in each reference signal by using the echo cancellation model to obtain the IRM corresponding to the N reference signals in each frequency band of each speech signal comprises:
performing multi-granularity feature extraction on each frequency-band component in the M speech signals and the N reference signals to obtain features of each frequency-band component in each of the M speech signals and the N reference signals; and
fusing the features of each frequency-band components in each of the M speech signals and the N reference signals, to obtain the IRM corresponding to the N reference signals in each frequency band of each speech signal.

12. The electronic device according to claim 11, wherein performing sub-band decomposition on each of the M speech signals and each of the N reference signals comprises:
determining a sub-band decomposition mode based on a type of a speech processing device; and
performing sub-band decomposition on each of the M speech signals and each of the N reference signals according to the sub-band decomposition mode.

13. The electronic device according to claim 11, wherein performing sub-band decomposition on each of the M speech signals and each of the N reference signals comprises:
determining a sub-band decomposition mode based on environment in which a speech processing device is located; and
performing sub-band decomposition on each of the M speech signals and each of the N reference signals according to the sub-band decomposition mode.

14. The electronic device according to claim 11, wherein, before processing the frequency-band components in each speech signal and the frequency-band components in each reference signal by using the echo cancellation model, the method further comprises:
normalizing the frequency-band components in each speech signal and the frequency-band components in each reference signal.

15. The electronic device according to claim 11, wherein, after obtaining the M echo-cancelled speech signals, the method further comprises:
inputting the M echo-cancelled speech signals into a speech recognition model to obtain a recognition result corresponding to the M echo-cancelled speech signals.

16. The method of claim 1, wherein performing multi-granularity feature extraction on each frequency-band component in the M speech signals and the N reference signals to obtain features of each frequency-band component in each of the M speech signals and the N reference signals comprises:
performing causal convolution processing on each frequency-band component to achieve feature extraction of each frequency-band component using the echo cancellation model.

17. The method of claim 1, wherein fusing the features of each frequency-band components in each of the M speech signals and the N reference signals, to obtain the IRM corresponding to the N reference signals in each frequency band of each speech signal comprises:
sending the features into a stacked LSTM network to model dynamic characteristics of a speech over time, wherein an output of the LSTM network constitutes learned high-level features;
sending the high-level features to a mask layer to obtain the IRM corresponding to the N reference signals in each frequency band of each speech signal.

* * * * *